United States Patent [19]

Matsuoka et al.

[11] Patent Number: 4,580,671
[45] Date of Patent: Apr. 8, 1986

[54] LOCK-UP CONTROL SYSTEM FOR AUTOMOBILE AUTOMATIC POWER TRANSMISSIONS

[75] Inventors: Toshihiro Matsuoka; Shizuo Sumida, both of Hiroshima, Japan

[73] Assignee: Mazda Motor Corporation, Hiroshima, Japan

[21] Appl. No.: 574,181

[22] Filed: Jan. 26, 1984

[30] Foreign Application Priority Data

Jan. 27, 1983 [JP] Japan .................................. 58-12021

[51] Int. Cl.⁴ .............................................. F16D 47/06
[52] U.S. Cl. .............................. 192/0.076; 192/0.033; 192/3.31; 192/3.33
[58] Field of Search ............... 192/0.033, 0.052, 0.076, 192/0.092, 0.096, 3.29, 3.3, 3.31, 3.33

[56] References Cited

U.S. PATENT DOCUMENTS 4,431,095 2/1984 Suga ..................................... 192/3.31
4,457,410 7/1984 Suga et al. ........................ 192/0.052

FOREIGN PATENT DOCUMENTS

56-138559 10/1981 Japan .

*Primary Examiner*—Rodney H. Bonck
*Assistant Examiner*—Richard M. Lorence
*Attorney, Agent, or Firm*—Fleit, Jacobson, Cohn & Price

[57] ABSTRACT

A control system for an automobile automatic power transmission provided with a hydraulic torque converter having a lock-up mechanism for directly connecting the input and output shafts of the torque converter. The control system uses a lock-up release data line and a lock-up engage data line which is positioned at the higher-engine speed side with respect to the lock-up release data line for controlling engagement of the lock-up mechanism. The system further provides a modified lock-up engage data line, which is between the lock-up engage and release lines, for use when the engine throttle valve is opened again after it has been completely closed, so that the lock-up mechanism is engaged as soon as the throttle valve is opened beyond the modified lock-up engage data line.

8 Claims, 11 Drawing Figures

LOCK-UP CONTROL SYSTEM FOR AUTOMOBILE AUTOMATIC POWER TRANSMISSIONS

The present invention relates to a control system for automatic power transmissions, and more particularly to a control system for transmissions provided with hydraulic torque converters. More specifically, the present invention pertains to a control system for transmissions provided with hydraulic torque converters having lock-up mechanisms for directly connecting input and output shafts of the hydraulic torque converters.

A hydraulic torque converter is in general provided with a vaned pump impeller, a turbine and a stator disposed therebetween. The vaned impeller is mounted on the input shaft and adapted to make the hydraulic fluid circulate through the turbine to drive the same. The stator is comprised of vanes which function to deflect the fluid flow so that the hydraulic fluid is drawn again into the impeller in a direction in which the hydraulic fluid flow does not disturb the rotation of the impeller. With this operation, it is possible to drive the turbine with a torque larger than the torque applied to the input shaft.

It is to be noted that as a characteristic of a hydraulic torque converter, the turbine driving torque increases at a higher rate when the speed ratio of the impeller to the turbine is high, or in other words, when the turbine speed is low as compared with the impeller speed. However, hydraulic torque converters unavoidably have slippage between the pumps and the turbines which cause decreases in transmission efficiencies and consequently result in poor fuel economy. Recently, in order to eliminate such decreases in power transmitting efficiency and to improve fuel economy it has been proposed to provide a torque converter with a lock-up mechanism for directly connecting the input shaft with the output shaft when the speed of the turbine becomes close to that of the impeller.

For example, Japanese patent disclosure No. 56-138559 discloses a lock-up control system which uses a control map having predetermined lock-up control lines which are functions of the engine speed and the engine load. Each lock-up control line defines a lock-up zone at the higher-engine speed side and a release zone at the lower-engine engine speed side. An engine speed sensor senses the rotational speed of the engine output shaft, or one of the shafts driven by the engine and generates an engine speed signal. An engine load sensor senses the load on the engine by detecting engine intake pressure and generates an engine load signal. A control unit such as a microprocessor judges whether the engine operating condition as determined by the engine speed signal and the engine load signal is in the lock-up zone or in the release zone. When the engine operating condition is judged as being in the operation zone, the converter lock-up mechanism is engaged. On the other hand, when the engine operating condition is judged as being in the release zone, the lock-up mechanism is disengaged.

In the case where the lock-up control map has only one control line, there may be a possibility of hunting wherein lock-up and release are alternately repeated and cause instability when the engine operating condition fluctuates in the vicinity of the lock-up control line. In order to prevent such possible hunting, the prior art uses two lines, namely, a lock-up release line and a lock-up engage line, which is at the higher-engine speed side in relation to the lock-up release line, to provide hysteresis between the lock-up engage and release operations.

Further, in the prior art control, it is usual to release lock-up when the engine throttle valve is fully closed irrespective of the relationship between the lock-up control lines and the engine operating condition. This is because when the throttle valve is fully closed, the engine output becomes generally unstable so that vibrations may be produced if the torque converter is locked-up. Moreover, it is advisable to release the lock-up when an engine braking effect is utilized by completely closing the throttle valve, because by doing such the engine speed can effectively be decreased due to the slippage in the torque converter.

It should however be noted that a lock-up control having the above features in combination is disadvantageous. For example, when the torque converter is locked up, and the engine operation condition as determined by the engine speed and the engine load signals is in the zone between the lock-up engage and release lines, the operation of completely closing the engine throttle valve and opening it again to the initial opening cannot restore the initial lock-up condition of the torque converter because, when the lock-up is once released by closing the throttle valve, opening the throttle valve to the initial position cannot bring the engine operating condition to the lock-up zone across the lock-up engage line. This will lead to a loss in fuel economy.

It is an object of the present invention to improve fuel economy in automobiles having torque converter type automatic transmissions provided with lock-up mechanisms.

Another object of the present invention is to provide a torque converter lock-up control system which does not have the problems described above. A further object of the present invention is to provide a torque converter lock-up control system in which the torque converter can be locked up whenever the lock-up of the torque converter is released by closing the engine throttle valve and thereafter the same is opened again to the initial position.

According to the present invention, the above and other objects can be accomplished by an automatic power transmission for automobiles comprising a hydraulic torque converter including an input member and an output member, said input member being connected with an engine output shaft, multiple stage transmission gear means connected with the output member of said torque converter, said transmission gear means being provided with a plurality of gear stages which are selected by changing power transmitting paths therein, means for sensing engine speed, means for sensing engine load, gear stage selecting means connected with said engine speed sensing means and said load sensing means to receive output signals from said two sensing means, said gear stage selecting means having means for comparing said output signals from said two sensing means with predetermined shift data stored therein and generating a shift control signal for shifting the gear stage to a selected gear stage in said transmission gear means, lock-up means for directly connecting said input and output members of said torque converter, lock-up zone discriminating means connected with said engine speed sensing means and said load sensing means to receive said output signals from said two sensing means, said lock-up zone discriminating means including lock-up control map means having at least one lock-up release data line and at least one lock-up engage data line which are drawn on the basis of engine speed and engine load for at least one of the gear stages, said lock-up engage data line being located at a higher engine speed side than said release data line, means in said lock-up zone discriminating means for comparing said output signals with said data lines and generating a control signal for controlling engagement of said lock-up means, gear shift means for selectively shifting the gear stage by changing said power transmitting path in said multiple stage transmission gear means, electromagnetic means responsive to said signal from said gear stage selecting means for controlling said gear shift means, lock-up control means for releasing said lock-up means irrespective of the control signal from said lock-up zone discriminating means when the operating condition of the automobile is at a predetermined condition, and enlarging the lock-up zone wherein said lock-up means is engaged again. In a preferable aspect of the present invention, the lock-up control means includes means for releasing the lock-up means when engine throttle valve means is fully closed and enlarging the lock-up zone so that the lock-up means is engaged when the engine throttle valve means is opened again to a position included in the enlarged lock-up zone. Alternatively, in the case where the automobile is equipped with a diesel engine, the lock-up control means may include means for releasing the lock-up means when the engine output control means, such as an engine control foot pedal, is located at the minimum output position, and for enlarging the lock-up zone so that the lock-up means is engaged when the engine output control means is moved from the minimum output position again to a position included in the enlarged lock-up zone. The lock-up control means may include means for shifting the lock-up engage data line toward the lock-up release data line to enlarge the lock-up zone. The gear shift means may include hydraulic actuator means for changing the power transmission path in said gear means and valve means for controlling the supply of hydraulic pressure to said actuator means.

The above and other objects and features of the present invention will become apparent from the following description of a preferred embodiment, taking reference to the accompanying drawings, in which.

Figure 1:
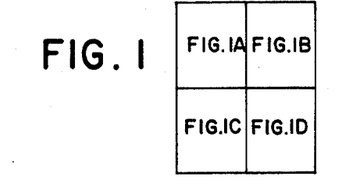
FIG. 1 is a diagramatical view of an automatic power transmission in which the present invention can be embodied.
Figure 1A:
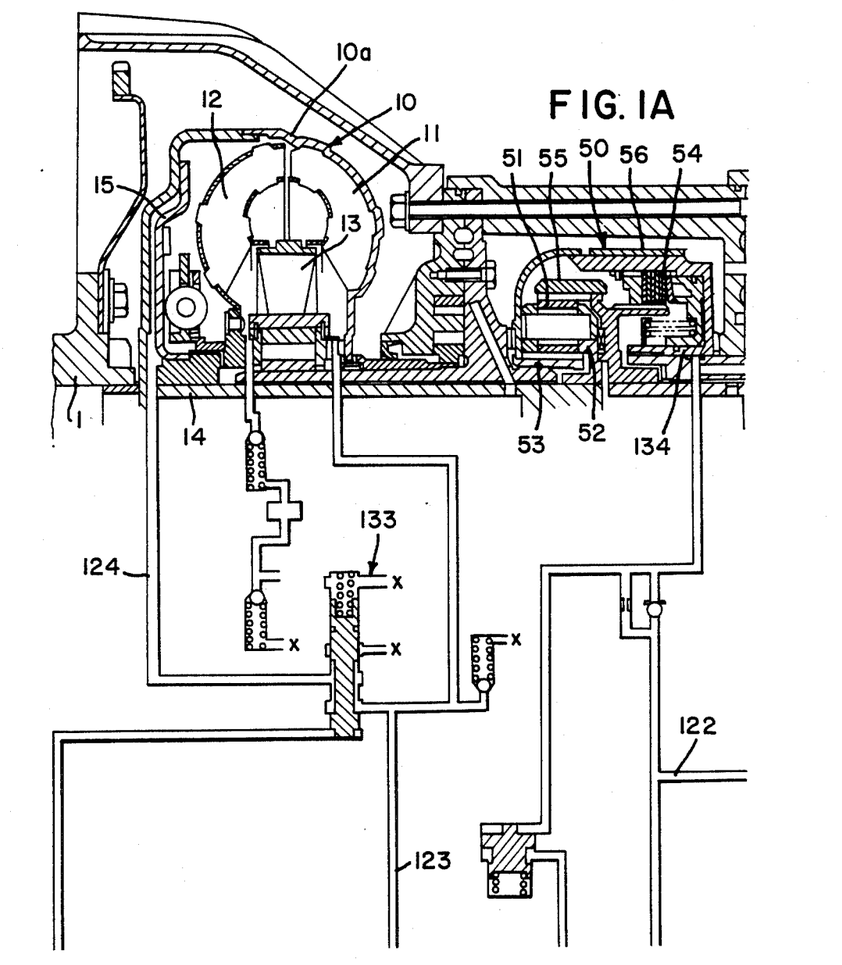
Figure 1B:
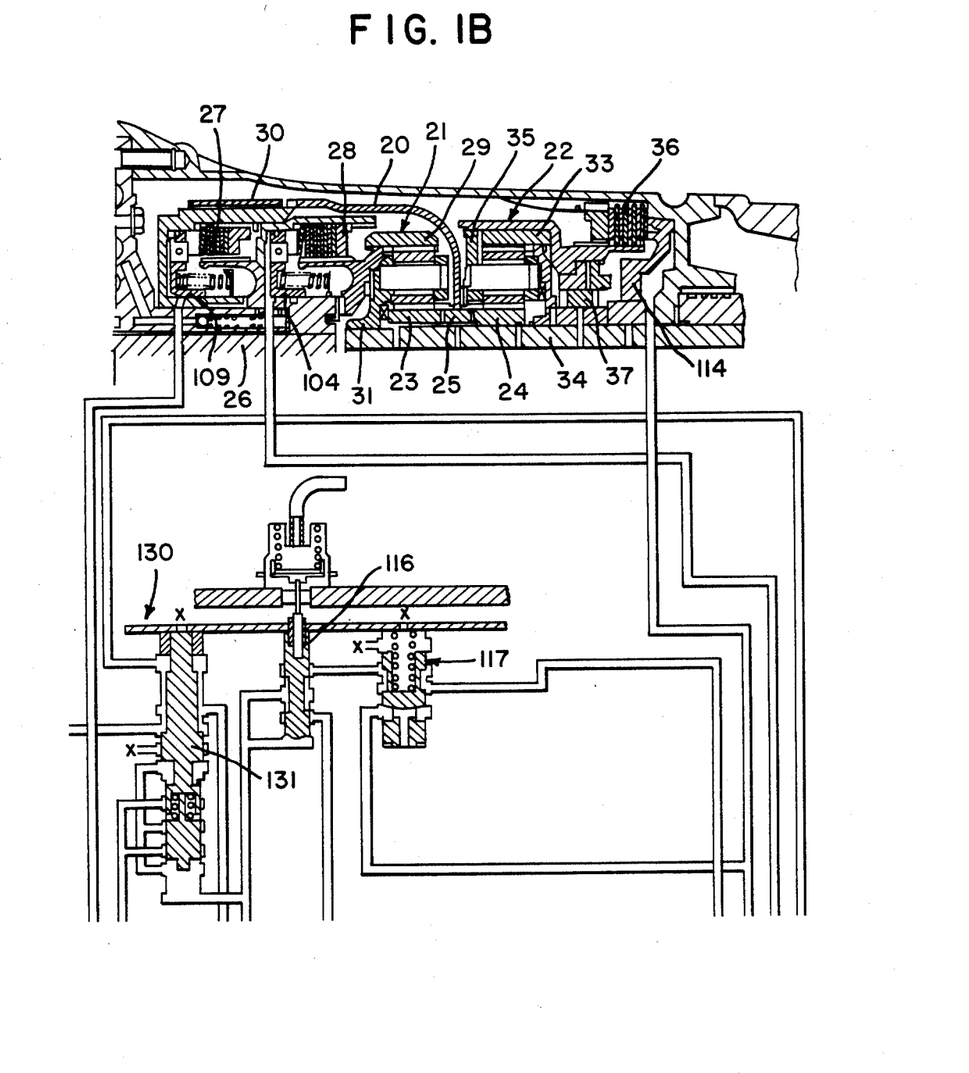
Figure 1C:
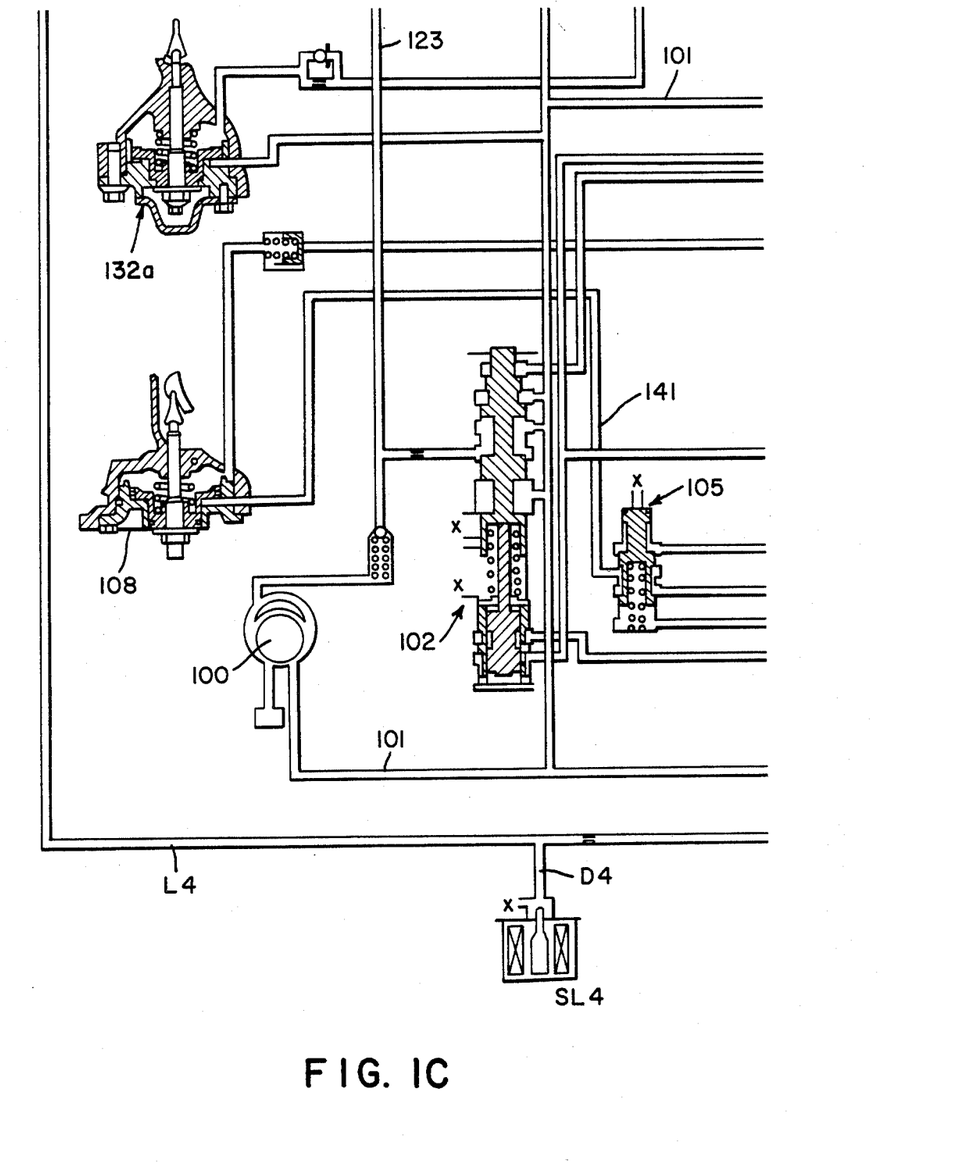
Figure 1D:
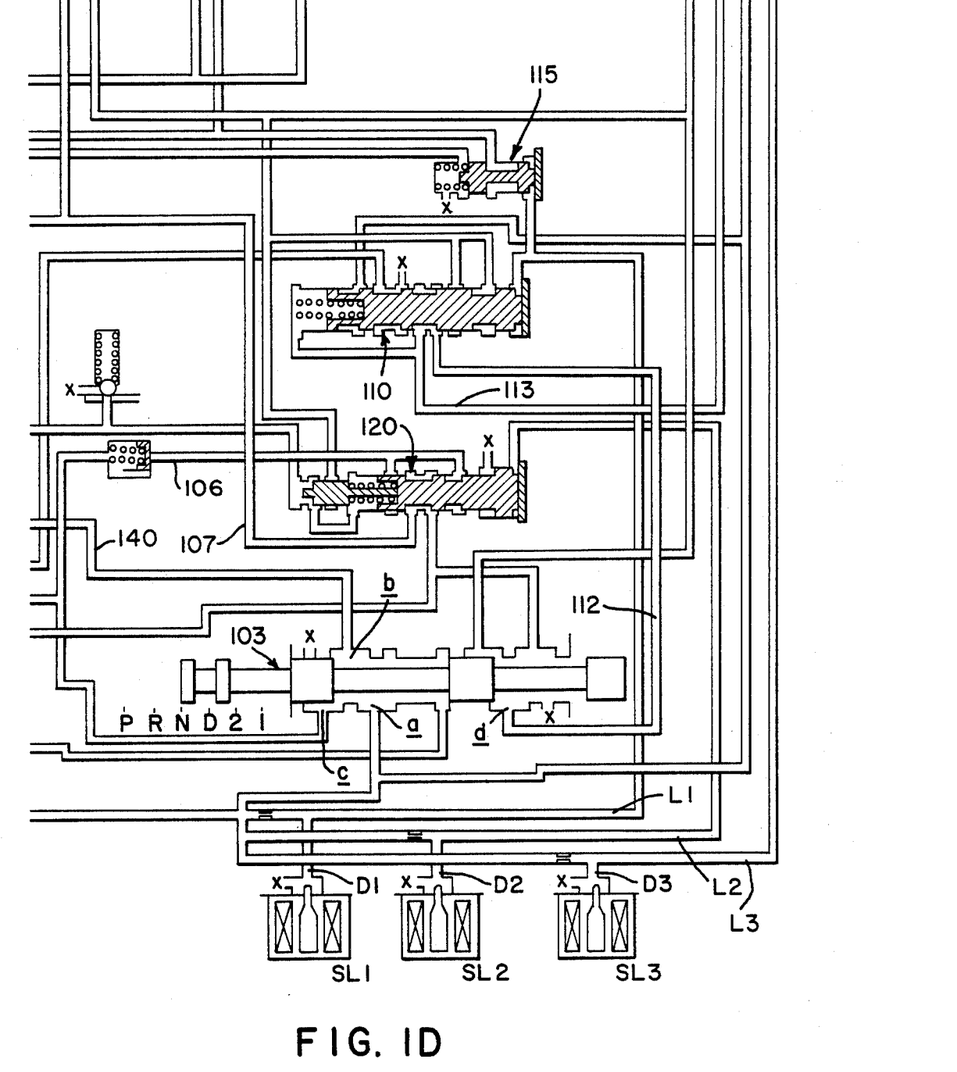

Referring to the drawings, and particularly to FIG. 1, there is shown an automatic transmission which comprises a hydraulic torque converter 10, a multiple stage transmission gear mechanism 20, and a planetary gear type over-drive transmission mechanism 50 arranged between the torque converter 10 and the multiple stage transmission gear mechanism 20.

The torque converter 10 has a pump 11 connected with an engine output shaft 1 through a converter casing 10a, a turbine 12 facing the pump 11, and a stator 13 disposed between the pump 11 and the stator 13. A converter output shaft 14 is connected with the turbine 12. A lock-up clutch 15 is provided between the converter output shaft 14 and the casing 10a which is connected to the pump 11. The lock-up clutch 15 is normally engaged with the casing 10a under the pressure of hydraulic fluid which circulates in the torque converter 10, and is released by hydraulic pressure which is drawn to a space between the casing 10a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mechanism 20 has an input shaft 26 connected through a front clutch 27 with the connecting rod 25 and through a rear clutch 28 with an internal gear 29 of the front planetary gear unit 21. A front brake 30 is provided between the connecting rod 25 or the sun gears 23, 24 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 37.

The planetary gear type over-drive transmission mechanism 50 includes planetary gears 51, a planetary carrier 52 rotatably carrying the planetary gears 51 and connected with the output shaft 14 of the torque converter 10, a sun gear 53 engaged with the planetary gears 51, and an internal gear 55 which is also engaged with the planetary gears 51 and connected with the sun gear 53 through a direct connecting clutch 54. An over-drive brake 56 is provided between the sun gear 53 and the transmission casing. The internal gear 55 is connected with the input shaft 26 of the multiple stage transmission gear mechanism 20.

The multiple stage transmission gear mechanism 20 is of a known type and can provide three forward driving gear stages and one reverse stage. The planetary gear type over-drive transmission mechanism 50 connects the shafts 14 and 26 directly when the direct connection clutch 54 is engaged and the brake 56 is released, and provides an over-drive connection between the shafts 14 and 26 when the brake 56 is engaged and the clutch 54 is released.

The above-mentioned automatic transmission is provided with a hydraulic control circuit as shown in FIG. 1. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of shift positions 1, 2, D, N, R and P. When the select valve 103 is positioned in one of the shift positions 1, 2 and P, the pressure line 101 is communicated with ports a, b, c of the select valve 103. The port a is communicated with a hydraulic actuator 104 for the rear clutch 28. When the select valve 103 is positioned in the above mentioned position the actuator 104 makes the rear clutch 28 engage. The port a is also communicated with the left-hand end portion of a 1-2 shift valve 110 having a spool which is now biased rightward in FIG. 1 under the oil pressure from the port a. The port a is further communicated with the right-hand end portion of the 1-2 shift valve 110 through a first line L1, the right-hand end portion of a 2-3 shift valve 120 through a second line L2, and the upper left-hand portion of a 3-4 shift valve 130 through a third line L3. Second and third drain lines D1, D2 and D3 are provided in the first, second and third lines L1, L2 and L3, respectively. These drain lines D1, D2 and D3 are respectively provided with a first, second and third solenoid valves SL1, SL2 and SL3 for opening and closing them. When the port a is communicated with the line 101 the solenoid valves SL1, SL2 and SL3 are energized to close the drain lines D1, D2, D3, and as a result, the pressure in the first, second and third line L1, L2, L3 increases.

The port b is communicated with a second lock valve 105 through a line 140. The oil pressure which is applied from the port b to the second lock valve 105 acts to bias the spool of the valve 105 downwards. When the spool of the valve 105 is in the lower position, the line 140 is communicated with the line 141 so that the oil pressure is introduced into a brake engaging pressure chamber of the actuator 108 to engage the front brake 30. The port c is communicated with the second lock valve 105. The oil pressure which is applied from the port c to the second lock valve 105 acts to bias the spool of the valve 105 upward. The port c is also communicated with the 2-3 shift valve 120 through a pressure line 106. The line 106 is communicated with a line 107 when the spool of the 2-3 shift valve 120 is moved leftward by the pressure in the second line L2, which increases upon energizing the solenoid valve SL2 in the drain line D2. The line 107 is communicated with the releasing pressure chamber of the actuator 108. When oil pressure is introduced into such releasing pressure chamber, the actuator 108 is moved to release the brake 30 against the pressure in the engaging pressure chamber. Besides, the pressure in the line 107 is introduced into the actuator 109 for the front clutch 27 to make the clutch 27 engage.

The select valve 103 has a port d which is communicated with the pressure line 101 when the valve 103 is positioned in the position 1. The port d is communicated with the 1-2 shift valve 110 through a line 112, and with an actuator 114 for the rear brake 36 further through a line 113. When the solenoid valves SL1 and SL2 are energized, the spools of the 1-2 shift valve 110 and the 2-3 shift valve 120 are moved to thereby change the port connections for engaging appropriate brakes and-/or clutches to establish 1-2, 2-3 shifting operations, respectively. The hydraulic control circuit is also provided with a cut-back valve 115 for making the oil pressure from the pressure regulating valve 102 stable, a vacuum throttle valve 116 for varying the line pressure from the pressure regulating valve 102 according to the suction pressure in the engine intake passage, and a valve 117 for backing up the throttle valve 116.

Furthermore, this hydraulic control circuit is provided with a 3-4 shift valve 130 and an actuator 132a for controlling the clutch 54 and the brake 56 of the planetary gear type over-drive transmission mechanism 50. The actuator 132a has an engaging pressure chamber communicated with the pressure line 101. The brake 56 is operated when the actuator 132a is moved under the pressure in the line 101. When the solenoid valve SL3 is energized, the spool of the 3-4 shift valve 130 is moved downward to communicate the pressure line 101 with a line 122 so that the oil pressure is introduced into the line 122. The oil pressure introduced into the line 122 acts on a releasing pressure chamber of the actuator 132a to release the brake 56, and on an actuator 132 to make the clutch 54 engage.

Still further, the present hydraulic control circuit is provided with a lock-up control valve 133, which is communicated with the port a of the select valve 103 through a line L4. From the line L4, there extends a drain line D4 which is provided with a solenoid valve SL4. When the pressure in the line L4 increases by closing the drain line D4 with the solenoid valve SL4 being energized, the lock-up control valve 133 has its spool moved to cut the communication between the lines 123 and 124 and drain the pressure in the line 124 so that the lock-up clutch 15 is engaged.

In the above arrangement, the relations of the respective transmission stages and the lock-up with respect to the operations of the solenoids, the clutches and the brakes are shown in tables 1 through 3.

TABLE 1

| Shift position | Solenoid valve | | |
|---|---|---|---|
| | 1 | 2 | 3 |
| 1 | OFF | OFF | OFF |
| 2 | ON | OFF | OFF |
| 3 | ON | ON | OFF |
| 4 | ON | ON | ON |

TABLE 2

| SOL4 | Lock-up |
|---|---|
| ON | engage |
| OFF | release |

TABLE 3

| | clutch 28 | clutch 27 | clutch 15 | clutch 54 | brake 36 | brake 30 | brake 56 | one-way clutch 37 | gear ratio |
|---|---|---|---|---|---|---|---|---|---|
| P | | | | o | | | | | |
| R | | o | | o | o | | | | 2.181 |
| N | | | | o | | | | | |
| D first | o | | | o | | | | o | 2.458 |
| second | o | | (o) | o | | o | | | 1.458 |
| third | o | o | (o) | o | | | | | 1.000 |
| OD | o | o | (o) | | | | o | | 0.685 |
| 2 | o | | | o | | o | | | 1.458 |
| 1 first | o | | | o | o | | | | 2.458 |
| second | o | | | o | | o | | | 1.458 |

Figure 2:
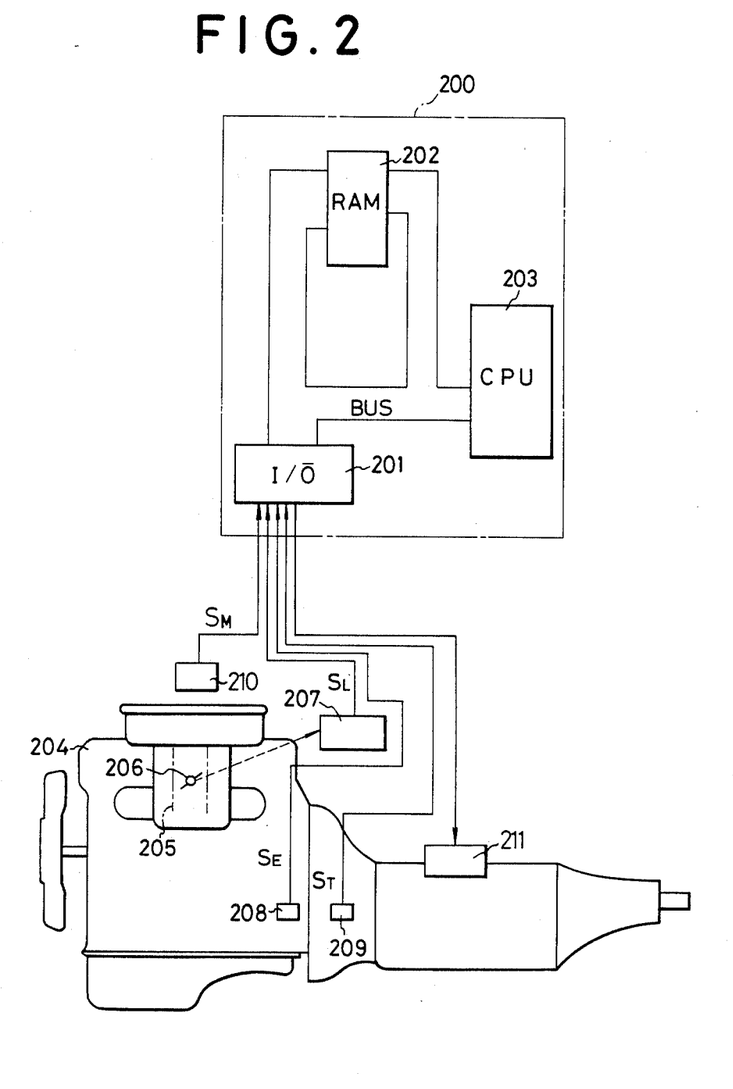
FIG. 2 is a diagram showing an electronic transmission control system for use with the transmission.

Referring to FIG. 2, there is shown an electronic control circuit 200 for controlling the above hydraulic control circuit. The electronic control circuit 200 can be constituted of a micro-computer which is provided with input-output equipment (I/O) 201, a random access memory (RAM) 202 and a central processinging unit (CPU) 203. For supplying signals to the I/O, there are provided an engine load sensor 207, an engine speed sensor 208, a torque converter turbine speed sensor 209 and a mode sensor 210. The engine load sensor 207 detects the load on an engine 204 in terms of the opening of an engine throttle valve 206 provided in the intake passage 205 of the engine 204 to produce an engine load signal SL. The engine speed sensor 208 senses the rotating speed of an engine output shaft 1 or of any other shaft driven by the engine 204 to produce an engine speed signal SE. The turbine speed sensor 209 senses the rotating speed of the converter output shaft 14 to produce a turbine speed signal ST. The mode sensor 210 senses the mode of operation of the vehicle, such as a power mode and an economy mode, to produce a mode signal SM. The operation mode may be selected as desired by an operator.

The I/O receives the engine load signal SL, the engine speed signal SE, the turbine speed signal ST and the mode signal SM, processes these signals, and applies them to the RAM 202. The RAM memorizes the signals SL, SE, ST and SM and applies these signals SL, SE, ST, SM and other data pre-stored in the RAM to the CPU in accordance with commands of the CPU. As part of the prestored stored data there is a lock-up control map shown in FIG. 3. The lock-up map may be provided for each gear stage and contains a lock-up release data line L off and a lock-up engage data line L on positioned at the higher-engine speed side with respect to the lock-up release line L off. The lock-up release and engage data lines L off and L on are predetermined as functions of the engine or converter turbine speed and the engine load. The lock-up operation data line L on defines a lock-up operation zone on the higher-engine speed side. On the other hand, the lock-up release line L off defines a lock-up release zone on the lower engine speed side. Between the lines L on and L off there is a hysteresis zone. As another example of pre-stored data, shift data lines may be provided as functions of the engine or turbine speed, the engine load and the operation mode of the vehicle.

Figure 3:
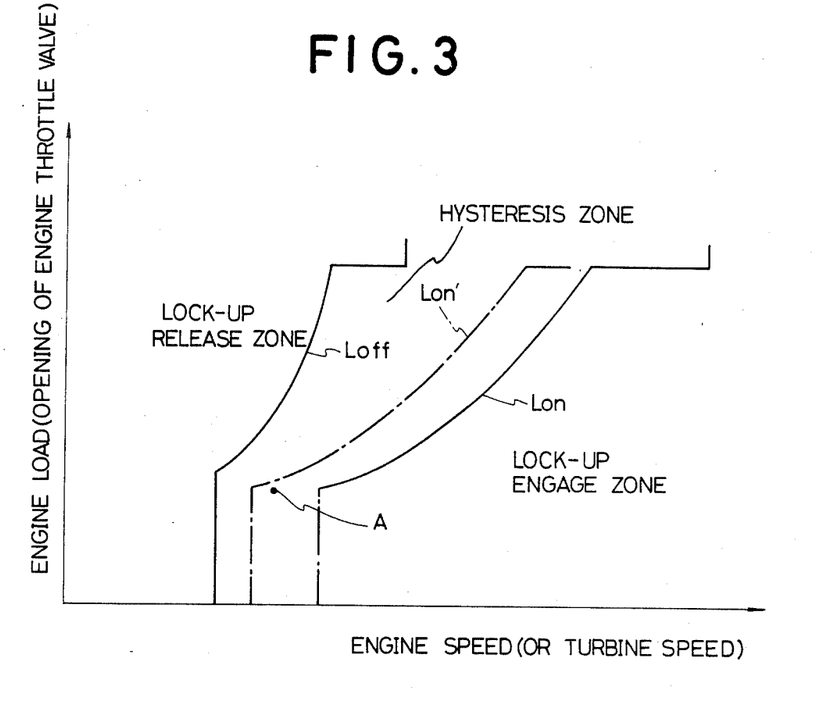
FIG. 3 shows one example of a lock-up control map including lock-up control data lines for lock-up control in the system; and, FIG. 4, 4A and 4B show a flow chart of the operation of the electronic transmission control system.

In accordance with a certain program which can be adopted in the present invention, the CPU 203 reads one of the shift lines and the lock-up control map shown in FIG. 3 according to the engine load signal SL and the mode signal SM, and determines whether or not a shift operation shall be carried out on the basis of comparison of the engine or turbine speed signal SE or ST with the shift line concerned, and whether or not lock-up shall be effected on the basis of comparison of the engine or turbine speed signal SE or ST with the lock-up control map. The CPU 203 thus produces a shift signal and a lock-up signal and applies them to a group of solenoid valves 211 for operating the 1-2 shift valve 110, the 2-3 shift valve 120, the 3-4 shift valve 130 and the lock-up control valve 133. The group of solenoid valves 211 includes the solenoid valves SL1, SL2, SL3 and SL4 for the 1-2, 2-3 and 3-4 shift valves 110, 120 and 130 and the lock-up control valve 133.

Figures 4, 4A:
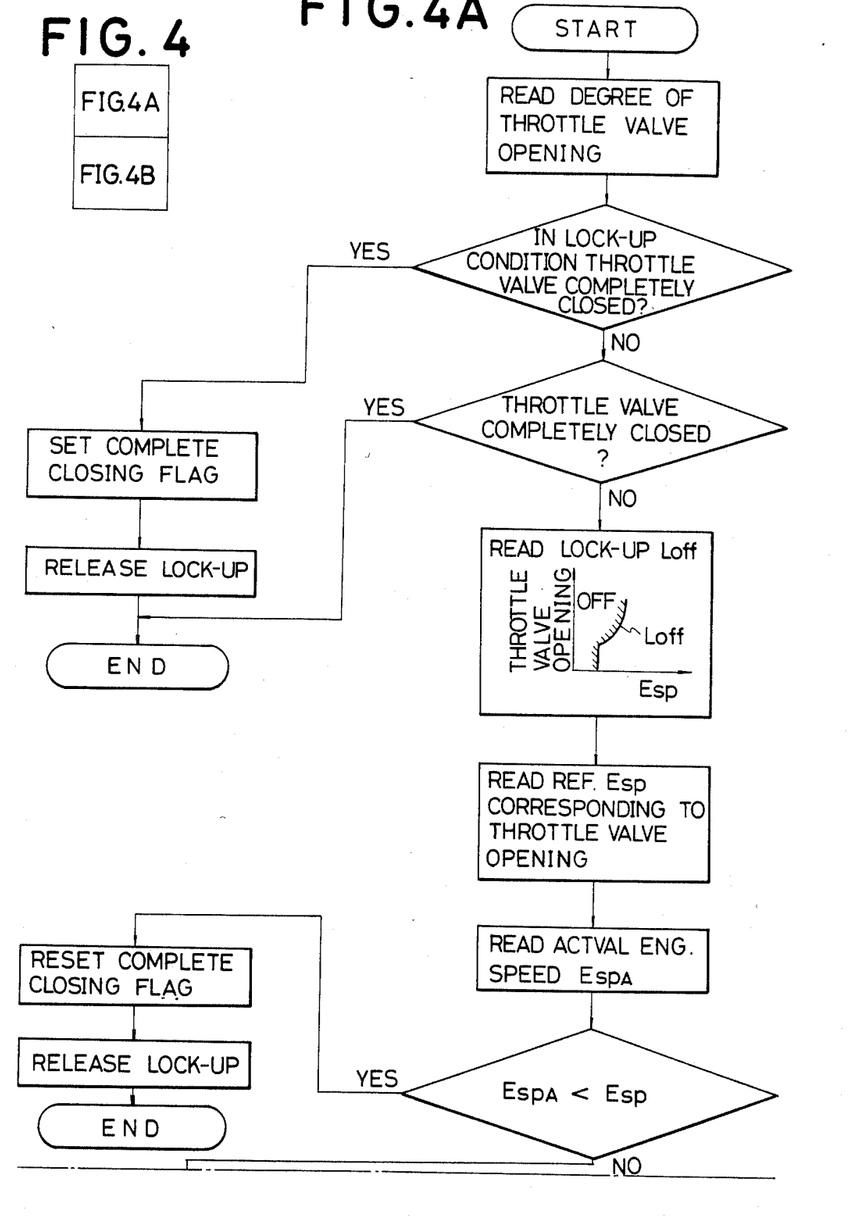
Figure 4B:
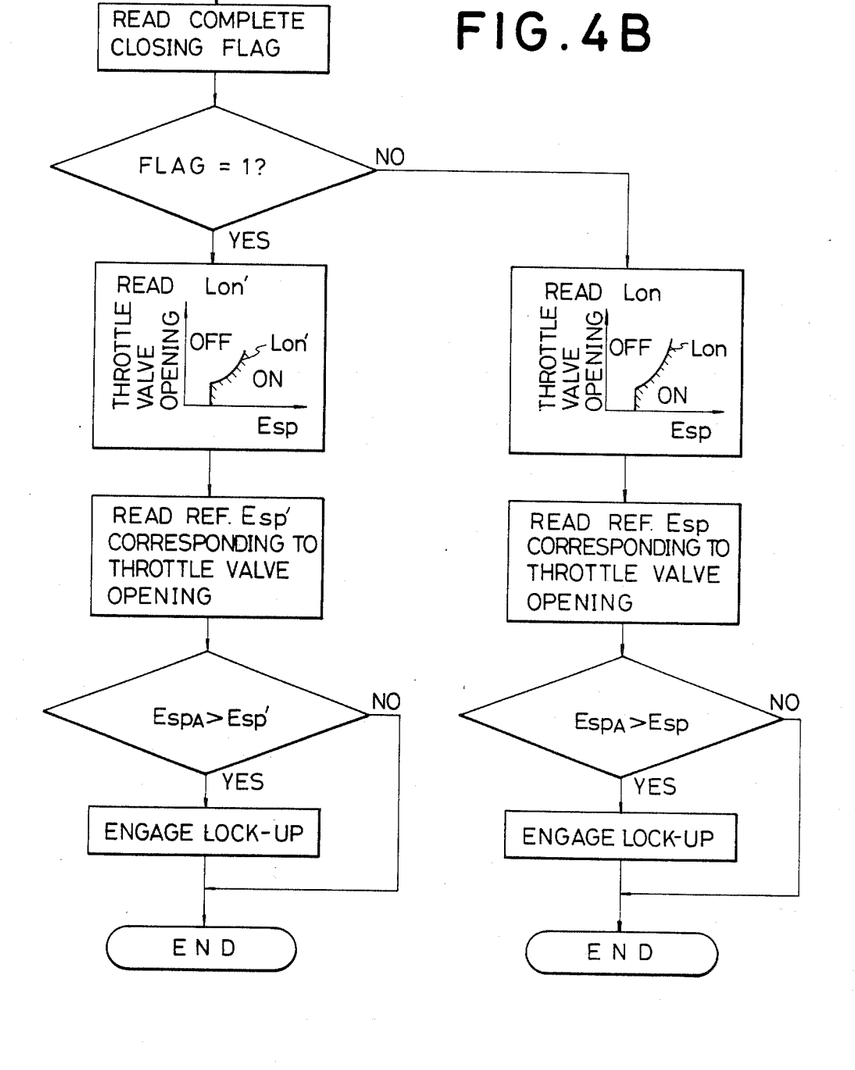

Lock-up control of the lock-up mechanism in the transmission by the electronic control circuit 200 will now be described with reference to FIG. 4. In the lock-up control, the control circuit 200 first reads the actual opening of the engine throttle valve, and judges whether or not the throttle valve is fully closed in an operating condition wherein the torque converter is locked up. When the throttle valve is fully closed from the lock-up condition, a complete closing flag is set to show the fact, and then lock-up is released. On the other hand, when it is found that the throttle valve has not been completely closed in the converter lock-up condition, the throttle valve opening is checked as to whether or not the throttle valve is completely closed. Where the throttle valve is completely closed, the program flow is terminated and the operating condition is maintained. If the throttle valve is found as being opened, the lock-up release data line L off shown in FIG. 3 is read. Then, a reference engine speed ESP corresponding to the throttle valve opening is obtained from the lock-up release line L off on the map as the value of the engine speed under which the lock-up mechanism shall be disengaged. Thereafter, the actual engine speed ESPA is read, and a judgement is made as to whether or not the actual engine speed ESPA is lower than the reference engine speed ESP.

When the actual engine speed ESPA is lower than the reference engine speed ESP, the complete closing flag is reset, and lock-up is released. On the other hand, when the actual engine speed ESPA is not lower than the reference engine speed ESP, the complete closing flag is read to judge whether or not the flag is "1" or whether the flag is set or not. When the flag is not set, the lock-up engage data line L on shown in FIG. 3 is read. Subsequently, a reference engine speed ESP corresponding to the actual throttle valve opening is obtained from the lock-up engage data line L on as a value of the engine speed under which the lock-up mechanism shall be engaged. Then, a judgement is made as to whether the previously read actual engine speed ESPA is higher than the reference engine speed ESP. When the actual engine speed ESPA is higher than the reference engine speed ESP, the lock-up mechanism is engaged. On the other hand, when the actual engine speed ESPA is not higher than the reference engine speed ESP, the lock-up mechanism is not engaged since the lock-up requirements are not fulfilled.

When the complete closing flag is in "1" position, namely, when the complete closing flag is already set, reference is made to a modified lock-up engage data line L on' shown by a dotted line in FIG. 3. As will be noted in FIG. 3, the modified lock-up engage data line L on' is provided by shifting the normal lock-up engage data line L on toward the lock-up release data line L off, and may be positioned in any position between the lock-up data line L on and the lock-up release line L off.

Thereafter, a modified reference engine speed ESP' corresponding to the actual engine throttle valve opening is obtained as a value of the engine speed at which the lock-up mechanism shall be engaged. Then, a judgement is made as to whether the previously read actual engine speed ESPA is higher than the modified reference engine speed ESP'. When the actual engine speed ESP is higher than the reference engine speed ESP', the lock-up mechanism is engaged. However, when the actual engine speed ESP is not higher than the reference engine speed ESP', the engagement of the lock-up mechanism does not take place. The aforementioned operation cycle is repeated with appropriate time intervals.

Assuming that a vehicle is being operated under a condition indicated by a point A in FIG. 3 with the lock-up mechanism engaged and the throttle valve is then fully closed, the lock-up mechanism is released because the operating condition comes into the lock-up release zone. If the throttle valve is then opened again to the initial position so that the vehicle is expected to restore the initial operation condition shown in the point A in FIG. 3, the lock-up mechanism will not be engaged again as far as the lock-up engage data line L on is maintained, since the point A is not positioned in the lock-up engage zone defined by the lock-up engage data line L on. It should however be noted that, in the present lock-up control, when the throttle valve is reopened after it has been fully closed, use is made of the modified lock-up engage data line L on' for controlling the lock-up mechanism. Thus, the lock-up engage zone is in effect enlarged toward the low engine speed side, and accordingly, the point A is included in the enlarged lock-up engage zone. As a result, the lock-up mechanism is engaged so that the fuel economy is improved.

The invention has thus been shown and described with reference to a specific embodiment; however, it should be noted that the invention is in no way limited to the details of the illustrated embodiment, but changes and modifications may be made without departing from the scope of the appended claims.

What is claimed is:

1. An automatic power transmission for automobiles comprising a hydraulic torque converter including an input member and an output member, said input member being connected with an engine output shaft, multiple stage transmission gear means connected with the output member of said torque converter, said transmission gear means being provided with a plurality of gear stages which are selected by changing power transmitting paths therein, means for sensing engine speed, means for sensing engine load, gear stage selecting means connected with said engine speed sensing means and said load sensing means to receive output signals from said speed sensing means and said load sensing means, said gear stage selecting means having means for comparing said output signals from each of said sensing means with predetermined shift data stored therein, and generating a shift control signal for shifting the gear stage to a selected gear stage in said transmission gear means, lock-up means for directly connecting said input and output members of said torque converter, lock-up zone discriminating means connected with said engine speed sensing means and said load sensing means to receive said output signals from each of said sensing means, said lock-up zone discriminating means including lock-up control map means having at least one lock-up release data line and at least one lock-up engage data line which are drawn on the basis of engine speed and engine load for at least one of the gear stages, said lock-up engage data line being located at a higher engine speed side than said release data line, means in said lock-up zone discriminating means for comparing said output signals with said data lines and generating a control signal for controlling engagement of said lock-up means, gear shift means for selectively shifting the gear stage by changing said power transmitting path in said multiple stage transmission gear means, electro magnetic means responsive to said signal from said gear stage selecting means for controlling said gear shift means, lock-up control means for releasing said lock-up means irrespective of the control signal from said lock-up zone discriminating means when an engine throttle valve means is fully closed and enlarging the lock-up zone so that the lock-up means is engaged when the engine throttle valve means is opened again to a position included in the enlarged lock-up zone.

2. An automatic power transmission in accordance with claim 1 in which said lock-up control means includes means for shifting the lock-up engaging data line toward the lock-up release data line to enlarge the lock-up zone.

3. An automatic power transmission in accordance with claim 2 in which said data line shifting means includes means for providing a modified lock-up engage data line which is between the lock-up release data line and the lock-up engage data line.

4. An automatic power transmission in accordance with claim 1 which further includes means for detecting that the engine throttle valve is fully closeed, said lock-up control means including means for shifting the lock-up engage data line toward the lock-up release data line to enlarge the lock-up zone when said detecting means detects that enlarge the lock-up zone when said detecting means detects that the engine throttle valve is fully closed.

5. An automatic power transmission in accordance with claim 1 in which said gear shift means includes hydraulic actuator means for changing the power transmission path in said gear means and valve means for controlling the supply of hydraulic pressure to said acutator means.

6. An automatic power transmission in accordance with claim 5 in which said electromagnetic means includes a plurality of solenoid valves for controlling the supply of hydraulic oil to said actuator means.

7. An automatic power transmission in accordance with claim 1 in which said lock-up engage data line and said lock-up release data line stored in said lock-up control means are provided as functions of engine speed and engine throttle valve opening.

8. An automatic power transmission in accordance with claim 1 in which said lock-up engage data line and said lock-up release data line stored in said lock-up control means are provided as functions of converter turbine speed and engine throttle valve opening.

* * * * *